United States Patent [19]
McBurney et al.

[11] Patent Number: 6,055,477
[45] Date of Patent: *Apr. 25, 2000

[54] USE OF AN ALTITUDE SENSOR TO AUGMENT AVAILABILITY OF GPS LOCATION FIXES

[75] Inventors: Paul McBurney, Palo Alto; Paul Braisted, San Jose, both of Calif.

[73] Assignee: Trimble Navigation Ltd., Sunnyvale, Calif.

[*] Notice: This patent is subject to a terminal disclaimer.

[21] Appl. No.: 08/887,954

[22] Filed: Jul. 3, 1997

Related U.S. Application Data

[63] Continuation of application No. 08/414,443, Mar. 31, 1995, Pat. No. 5,646,857.

[51] Int. Cl.$^7$ .................... G01S 5/00; G05D 1/00
[52] U.S. Cl. .......................... 701/207; 701/213
[58] Field of Search ...................... 701/207, 208, 701/213, 300

[56] References Cited

U.S. PATENT DOCUMENTS

| | | | |
|---|---|---|---|
| 4,292,671 | 9/1981 | Evans et al. | 364/433 |
| 4,463,357 | 7/1984 | MacDoran | 343/460 |
| 4,513,378 | 4/1985 | Antkowiak | 364/450 |
| 4,514,733 | 4/1985 | Schmidtlein et al. | 343/5 MM |
| 4,584,646 | 4/1986 | Chan et al. | 364/449 |
| 4,829,304 | 5/1989 | Baird | 342/63 |
| 4,894,662 | 1/1990 | Counselman | 342/357 |
| 4,910,674 | 3/1990 | Lerche | 364/443 |
| 4,939,663 | 7/1990 | Baird | 364/449 |
| 4,977,509 | 12/1990 | Pitchford et al. | 364/449 |
| 4,983,980 | 1/1991 | Ando | 342/357 |
| 5,057,835 | 10/1991 | Factor et al. | 340/995 |
| 5,142,480 | 8/1992 | Morrow | 364/452 |
| 5,186,418 | 2/1993 | Lauritsen | 244/138 A |
| 5,191,792 | 3/1993 | Gloor | 73/178 R |
| 5,202,829 | 4/1993 | Geier | 364/449 |
| 5,208,757 | 5/1993 | Appriou et al. | 364/456 |
| 5,210,540 | 5/1993 | Masumoto | 342/357 |
| 5,216,611 | 6/1993 | McElreath | 364/454 |
| 5,225,842 | 7/1993 | Brown et al. | 342/357 |
| 5,257,195 | 10/1993 | Hirata | 364/449 |
| 5,265,025 | 11/1993 | Hirata | 364/449 |
| 5,272,639 | 12/1993 | McGuffin | 364/449 |
| 5,345,241 | 9/1994 | Huddle | 342/63 |
| 5,355,316 | 10/1994 | Knobbe | 364/453 |
| 5,430,654 | 7/1995 | Kyrtsos et al. | 364/449 |
| 5,485,384 | 1/1996 | Falconnet | 364/449 |
| 5,493,694 | 2/1996 | Vlcek et al. | 455/53.1 |
| 5,527,003 | 6/1996 | Diesel et al. | 244/195 |
| 5,646,857 | 7/1997 | McBurney et al. | 701/213 |

OTHER PUBLICATIONS

Alfred Leick, "GPS Satellite Surveying," 2nd edition, pp. 215–232, 410–450, and 486–499, John Wiley & Sons, Jan. 1995.

R.G. Brown & P. Hwang, "Random Signal Analysis & Kalman Filtering," 2nd edition, pp. 409–455, John Wiley & Sons, 1995.

"Navstar GPS Space Segment/Navigation User Interfaces," Interface Control Document GPS(200), No. ICD–GPS–200, Rockwell International, Satellite Systems Division, Rev. B–PR, IRN–200B–PR–001, Apr. 16, 1993.

*Primary Examiner*—William A. Cuchlinski, Jr.
*Assistant Examiner*—Ed Pipala
*Attorney, Agent, or Firm*—John Schipper

[57] ABSTRACT

Methods for GPS-assisted determination of location coordinates of a mobile user or selected position on or adjacent to the Earth's surface with improved accuracy. Elevation readings from an altimeter or barometer are integrated with readings of the GPS-determined elevation coordinate for that location, using Kalman filter techniques, minimum least square techniques, or comparison of certain statistically defined parameters associated with the altimeter and GPS variables, such as the standard deviation of the expected errors in these variables. The resulting elevation coordinate may be a statistical blend or filtered blend of the altimeter value and a GPS-determined value for the elevation coordinate; or this resulting elevation coordinate can be chosen to be one or the other of these values, based upon comparison of time varying statistical parameters corresponding to the altimeter and the GPS.

13 Claims, 3 Drawing Sheets

USE OF AN ALTITUDE SENSOR TO AUGMENT AVAILABILITY OF GPS LOCATION FIXES

This is a continuation of U.S. application Ser. No. 08/414,443 filed on Mar. 31, 1995 now U.S. Pat. No. 5,646,857.

FIELD OF THE INVENTION

This invention relates to enhancement of the availability and accuracy of two- and three-dimensional location coordinates from a global positioning system by use of supplementary information.

BACKGROUND OF THE INVENTION

The Global Positioning System (GPS) is a network of 24 satellites that is maintained by the United States Department of Defense and is used to determine the location of an antenna that passively receives signals from a number of these satellites. The GPS satellites are distributed among six orbits (four satellites per orbit) inclined at about 55° from the equator, with consecutive satellite orbits being separated by about 60° longitude across the equator. The four satellites in each orbit have roughly 12-hour orbits, and the number of satellites visible at any location on the Earth varies with time.

A range measurement is obtained from each satellite along with the location of the satellite at the time of measurement. The range measurement, referred to as pseudorange, is obtained by measuring the propagation time of the signal from the satellite to the user antenna. The pseudorange measurement has an additive component that is proportional to the relative frequency offset between the receiver oscillator and the satellite oscillator.

At least four GPS satellite pseudoranges are needed to solve for the antenna location because four unknowns are present: the (x,y,z) location coordinates of the receiver antenna in an Earth-centered, Earth-fixed (ECEF) coordinate frame, and the clock bias of the receiver oscillator relative to the GPS time frame. This is known as a three-dimensional location fix, because all three components of the antenna location are determined. The latitude, longitude and altitude of the antenna are easily computed from the (x,y,z) location coordinates with a well known coordinate transformation.

Altitude is generally understood to represent the height above sea level. The mean-sea-level (MSL) altitude of the antenna is found by converting the computed x,y,z position in ECEF coordinates into the height above a reference ellipsoid defined with the WGS-84 (World Geodetic Survey of 1984) model. This model takes into account the ellipticity of the Earth. A second model is used to obtain a correction between the ellipsoid model and mean-sea-level at the latitude and longitude computed from the ECEF coordinates (x,y,z). The MSL altitude is the difference between the MSL height and the local height of the reference ellipsoid.

Two factors affect the accuracy of the location fix. First, the pseudorange measurement from each satellite contains additive errors from a number of sources, such as errors in the satellite position, propagation-induced signal delays, errors from multipath signals, noise in the receiver, and intentionally induced errors from Selective Availability (SA). Second, the relative geometry of the satellites used for the solution controls how the measurement errors are incorporated into the location solution. A unit of measure of suitability of the satellite geometry is the dimensionless position dilution of precision (PDOP) parameter. The PDOP value helps determine how zero mean, unit variance errors, which are independent for each satellite, are scaled into errors in the location solution.

The PDOP parameter is well known in the practice of navigation and is calculated from a matrix of direction cosines, defined by projections of a unit vector extending from the receiver antenna to each satellite, onto selected coordinate axes. The PDOP value associated with a location fix computed using four pseudoranges is inversely proportional to the volume of the tetrahedron formed by first connecting these four unit vectors at the antenna location, and then connecting the other ends of the unit vectors into four planes, each of which is formed at ends of three of these unit vectors. The largest volume, and thus the smallest and best PDOP value, occurs when one satellite is directly overhead and the other three satellites are located near the horizon and spaced apart longitudinally 120° from each other. The smallest volume, and thus the largest and worst PDOP value, occurs when the ends of the unit vectors all lie in the same plane. In this case, the volume is zero and the PDOP is infinite.

The PDOP parameter can be decomposed into horizontal and vertical dilution of precision components, HDOP and VDOP. Because the satellites are generally always above the horizon of the antenna, the VDOP parameter is generally at least twice as large as the HDOP parameter. A large portion of the measurement error is translated into the vertical direction error. For this reason, the vertical position accuracy tends to degrade faster than the horizontal accuracy when the PDOP value becomes large.

An estimate of the accuracy of the location fix is obtained by multiplying the PDOP value by an estimate of the pseudorange error standard deviation, expressed in length units. When SA is present, this error can be as large as 5–50 meters. With SA absent, a typical error is generally 5–15 meters. A good PDOP value is in the range 2–6. Thus, for this range of pseudorange errors, the accuracy of the position solution can vary from 10–90 meters without SA, and from 10–300 meters with SA. The DoD claims the inaccuracy of the horizontal position to be no more than 100 meters 95 percent of the time. This corresponds to a two-sigma horizontal position error with a range error standard deviation of 33 meters and an HDOP value of 1.5.

As the PDOP value becomes larger (say, PDOP>6), the location accuracy begins to degrade significantly. In this case, a good three-dimensional location fix may be unavailable. Most GPS receivers have a maximum value of PDOP at which a three-dimensional location fix is performed; for larger PDOP values, the receiver may begin to compute a two-dimensional location fix instead. It is assumed that a satellite range measurement is available that is exactly in the vertical direction, which is equivalent to having a satellite at the center of the Earth. The range measurement is effectively the distance from the center of the Earth to the user antenna. This measurement is called an altitude fix because the altitude computed from the resulting (x,y,z) location fix is mathematically constrained to be the altitude used when the measurement is made. In other words, the measurement specifies what the altitude coordinate of the location solution will be.

A location solution computed with this type of measurement can be thought of as a three-dimensional location fix that is constrained to have a fixed component in the vertical direction. Thus, the location fix has only two degrees of freedom and is referred to as a two-dimensional location fix. As a result of this measurement, the VDOP value of the resulting location solution implicitly has a value of unity, because any altitude error in the measurement will be mapped into the altitude error of the location solution with a scale factor of 1. For most satellite geometries, use of an accurate altitude measurement will lower the overall PDOP value significantly, because of use of VDOP=1. Thus, two-dimensional navigation is possible with only three satellites, if the resulting HDOP value is less than a user-supplied limit.

The altitude measurement can also be included with the system of equations with more than three satellite measurements. In this case, the location solution is overdetermined; that is, more equations than unknowns are present. The resulting altitude solution will be a compromise between the altitude measurement and the altitude solution that would be available from the satellite-only vertical location solution. As a result, the altitude measurement must be weighted more heavily, in order to force the computed altitude to be close to the altitude supplied in the altitude measurement. Overdetermined solutions are a generalization of the solutions discussed here, where the number of measurements is assumed to be equal to the number of unknowns. In either case, the altitude measurement can be used to control the altitude of the computed ECEF location coordinates (x,y,z).

In summary, in at least two situations a need exists to stabilize the location solution. In a first situation, signals from fewer than four satellites are received, because other satellites are blocked by obstructions, or because only three satellites are available above the horizon. In a second situation, a good PDOP value from a four-satellite, three-dimensional location solution is not available. In these situations, a typical receiver adopts one of two modes. In a first mode, the receiver does not compute a location fix, because the user requested only three-dimensional fixes. In a second mode, the receiver goes into an altitude-hold mode, where the receiver assumes that the altitude is fixed, and uses this assumption to generate the fourth measurement needed to obtain a three-dimensional location solution. The altitude used is generally the last altitude computed from a three-dimensional GPS solution or from a reference altitude externally supplied to the receiver.

The receiver in altitude-hold mode cannot update the antenna altitude. If the receiver moves only in a horizontal plane, and if the assumed altitude is correct, the receiver will report the correct horizontal position, within the accuracy of the measurements and the associated PDOP value. However, if the user antenna changes altitude, or if the assumed altitude has a large error, large errors will be observed in both the horizontal and vertical location solutions. Thus, a user relying on this navigation system will not observe an altitude change when, in fact, the altitude is changing.

In this situation, the altitude sensor is of great value. When a three-dimensional location solution cannot be obtained with only GPS satellite signals, the altitude sensor can be used to generate an altitude measurement that can be added to the satellite measurements to generate a true three-dimensional location fix. Here, the altitude solution changes when the user antenna changes altitude and does not maintain a constant altitude as in altitude-hold mode.

Some workers have used elevation-measuring instruments in unconventional ways to increase the accuracy of location measurements. Evans et al disclose a digital altimeter computer using an atmospheric pressure transducer, in U.S. Pat. No. 4,292,671. The apparatus uses a predetermined local ground level pressure value and a nonlinear pressure-versus-altitude equation that takes different forms in two altitude ranges. Only the altitude coordinate A is determined here, and the formalism is apparently valid only for the range 1,000 ft$\leq$A$\leq$70,000 ft. above the Earth's surface. In particular, no account is taken of local variation of distance of the Earth's surface from the Earth's center.

A presentation system that magnifies and projects selected portions of a standard navigating chart is disclosed in U.S. Pat. No. 4,513,378, issued to Antkowiak. A vehicle carrying the system receives location-indicating signals from speed and direction sensors on the vehicle, from human input signals, and from radio waves transmitted from two or more Loran stations, and integrates these signals to estimate where the vehicle is presently located. The system then selects and projects a portion of the chart that includes this estimated present location and calculates a "course to steer" based on dead reckoning, manually entered information on nearby monuments, and other navigational aids.

U.S. Pat. No. 4,514,733, issued to Schmidtlein et al, discloses a navigational control system for aircraft that uses already-entered topographical data and terrain details, acquired by an earlier flight over the same territory and flight path as the present flight path. The reference material used to enter the topographical data may include stereo photos, topographic maps, etc. A radar transmitter and receiver, directed at the ground immediately below, is used to monitor the relative height of the aircraft along its flight path. No provision is made for receipt and analysis of altitude and horizontal location data that are presently gathered as the flight proceeds.

Chan et al, in U.S. Pat. No. 4,584,646, disclose a navigation system that compares terrain map correlation and dead reckoning location determination to determine horizontal, two-dimensional error estimates for the present location of an aircraft following a prescribed flight path. Previously measured terrain data, expressed in the frequency domain, are correlated with reference elevations stored in a map format and are used to improve the accuracy of a dead reckoning estimation of present location. An error is asserted to be determined for a barometric pressure altimeter used with the system, but the method for such determination is not discussed.

U.S. Pat. No. 4,829,304, issued to Baird, discloses a map-aided navigation system that uses TERCOM-SITAN control signals. An aircraft flies over terrain to be mapped and estimates aircraft location and altitude at a sequence of sampling points. These data are Kalman filtered, and the resulting filtered data are used to determine elevation and slope for this terrain. On a subsequent flight over this terrain, an aircraft uses altimeter sensing and the terrain map to determine the most likely flight path actually followed by the aircraft.

A navigation-by-correlation system for aircraft, using a relatively transparent atmospheric window (94 GHz) for measurements, is also disclosed by Lerche in U.S. Pat. No. 4,910,674. The aircraft is flown over a selected flight path, and the ground below is continually scanned in a direction transverse to the flight path direction. The system searches for an elevation that provides maximum correlation of the elevation reference data in a system computer with the location information received by the scanner. This approach requires that information on local elevation of the terrain flown over be already loaded into the system.

A vehicle navigation system that uses local topographical maps to correct an aircraft flight path is disclosed in U.S. Pat. No. 4,939,663, issued to Baird. During flight, local altitude measurements are made and used with a digital database containing local elevation (above a ground reference surface) of the Earth's surface. The location of the aircraft is sampled separately and is compared with the local elevation contour corresponding to the altimeter measurement; a location correction is determined that places the aircraft location over the elevation contour. Here, the local altitude coordinate of the aircraft is determined exclusively by the altimeter measurement, and the other two aircraft position coordinates are determined approximately by independent position sampling, which may use aircraft dead reckoning.

In U.S. Pat. No. 4,977,509, issued to Pitchford et al, a handheld, multi-purpose navigational instrument is disclosed that determines bearing, inclination, declination, temperature, barometric pressure, elapsed time and other variables. The apparatus uses an internal flux gate magnetometer for orientation information and uses a real time clock for time measurement, a foldable LCD display for navigation information, a keyboard for data entry and function choice, and a microprocessor for determining instrument two-dimensional location utilizing internal software and magnetometer measurements. Barometric pressure measurements, corrected for local temperature, are used to determine altitude or elevation.

Ando discloses a use of a vehicle-mounted GPS antenna and receiver for tracking GPS satellite signals without interruption when the vehicle passes through tunnels or urban canyons ("dead zones") and the GPS signals are temporarily lost, in U.S. Pat. No. 4,983,980. As soon as the vehicle emerges from the dead zone, the GPS receiver acquires a GPS signal from one satellite with the highest elevation angle, then begins to search for other GPS satellites, using known relative orbital positions for each GPS satellite. This approach is intended to reduce the time required for capture of GPS signals from a plurality of GPS satellites.

A map and text display system for aircraft navigation is disclosed by Factor et al in U.S. Pat. No. 5,057,835. The system stores terrain elevation information for regions adjacent to a flight path and compares the presently measured aircraft altitude with the maximum terrain elevation for the local region over which the aircraft is positioned, to determine if the aircraft altitude is above a safety threshold for that region. Aircraft latitude, longitude and altitude are determined conventionally, and no second source of aircraft altitude information is used to vary or improve the altitude estimate.

In U.S. Pat. No. 5,142,480, Morrow discloses method and apparatus for determination of a safe glide path for an aircraft approaching a landing site. The system uses horizontal location information provided by two or more Loran radiowave sources and vertical location information provided by an altimeter. The system provides backup calculations of all three location coordinates by the Loran information, if the altimeter is not operative. However, if the altimeter is operative, no integration of the altimeter readings and the Loran-determined vertical coordinate readings is performed.

A guidable airborne instrument module is disclosed in U.S. Pat. No. 5,186,418, issued to Lauritsen. The module, when released, receives signals from a plurality of ground-based beacons and determines the altitude and horizontal location of the module, for purposes controlling a module rudder to cause the module to controllably descend to a chosen landing site. An on-board radio transmitter broadcasts the present location of the module as the module descends.

Gloor, in U.S. Pat. No. 5,191,792, discloses a handheld navigation instrument that uses a magnetometer and a pressure sensor to provide information on the present heading and the present altitude, respectively, of a user. A microprocessor contained therein switches between a direction computation mode with LCD display and an altitude computation mode with LCD display.

In U.S. Pat. No. 5,202,829, Geier discloses a shipboard location determination system in which GPS-determined pseudorange values are passed through a Kalman filter. The Kalman-filtered pseudorange values PR are monitored to determine the quality of each such PR value in a weighted least squares location solution process. The location solutions can be visually displayed as error ellipses.

An on-board system for determination of the location of an airborne vessel, such as an aircraft, is disclosed in U.S. Pat. No. 5,208,757, issued to Appriou et al. The spatial coordinates of discrete landmarks on the terrain below are entered into a computer memory. As the vessel flies over a landmark, the known location of this landmark is used to correct the location given by another navigation means that uses images of small portions of the terrain below for location determination. Kalman filtering is applied to the location of the vessel relative to the terrain.

Masumoto discloses a GPS location determination system, supplemented by an altimeter, in U.S. Pat. No. 5,210,540. When three-dimensional GPS-determined location coordinates are available, the system ignores the altimeter, irrespective of the quality of the GPS signals. When only two location coordinates (latitude and longitude) are available using the GPS signals, the system uses the altimeter to provide a third (relative altitude) coordinate. No blending or optimization of the GPS and altimeter readings is disclosed or suggested. The system also stores measured altitude values for major roads and compares these values with the altimeter readings by map matching of latitude and longitude coordinates.

An integrated aircraft guidance system, using GPS, an inertial navigation system (INS) and a microwave landing system (MLS), is disclosed by McElreath in U.S. Pat. No. 5,216,611. The aircraft uses a Kalman filter to integrate GPS and INS navigation data for most of a point-to-point flight, until the aircraft comes within a few miles of the destination airport, where valid MLS data become available. The Kalman filter is then calibrated by the MLS data to permit precision landing using only the combined GPS/INS system, if MLS signals are lost during the landing. The locations determined by GPS/INS alone and by MLS alone are weighted to produce a composite location estimate, using only the distance d of the aircraft from the destination to determine the relative weights. The GPS/INS weight varies from 0.0 at d≦5 nautical miles to 1.0 at d≧10 nautical miles. No specific information is given on integration of the GPS and INS data.

U.S. Pat. No. 5,225,842, issued to Brown et al, discloses a vehicle tracking system that uses a GPS translator (not a full GPS receiver/processor) to sense certain GPS satellite signals at the vehicle. This GPS signal information is transmitted, unprocessed, to a remote GPS master station where this information is analyzed and the vehicle location and velocity are determined by post-processing. The master station can also employ satellite altitude maps and other aids, such as estimates of atmospheric time delays and clock offsets, to determine the changing locations of GPS satellites whose signals are received by the GPS translator on the vehicle.

A dead reckoning location detector and a GPS location determination system are combined for vehicle navigation in U.S. Pat. No. 5,257,198, issued to Hirata. GPS data are used preferentially to determine vehicle location, if GPS signals from at least three satellites are available. If these signals are not available, or if the GPS-determined distance the vehicle has traveled exceeds a predetermined threshold, dead reckoning is used exclusively to estimate the present vehicle location.

Hirata discloses a navigation system using a GPS location determination system, supplemented with altimeter information, in U.S. Pat. No. 5,265,025. If signals from four or more GPS satellites are available, three-dimensional coordinates for the user's present location are determined using standard GPS techniques. If signals from three or fewer GPS satellites are available, altimeter data are used to determine a vertical location coordinate, and the GPS signals are then used to determine two horizontal coordinates for the user's present location. This method takes no account of the relative quality of the vertical coordinate data produced by the altimeter and by the GPS.

In U.S. Pat. No. 5,345,241, Huddle discloses a method for correction of inertial navigation information, when an aircraft flies over water. An on-board barometric altimeter and radar altimeter measure the aircraft vertical distance above the surface of an ellipsoidal model of the Earth and above the water surface, respectively. An on-board computer determines the differences of these two distances for a plurality of points along the aircraft path. These differences are compared with reference to a model of undulation of the true surface with respect to the ellipsoidal surface to determine deviations of the actual aircraft path from an ideal path.

An altimeter-assisted re-entry vehicle (REV) inertial navigation system is disclosed in U.S. Pat. No. 5,355,316, issued to Knobbe. Altimeter readings are taken and combined with the inertial system determination on the altitude in a Kalman filter arrangement that provides a correction to the inertial system altitude fix.

What is needed is an approach that supplements location coordinates determined by a GPS with measurements of one or more location coordinates by another instrument, such as an altitude sensor, to improve the accuracy of the location coordinates and/or the availability of two-dimensional and three-dimensional location fixes. Preferably, this approach should allow an estimate of the reduction in inaccuracy that this combination produces, based upon estimatable inaccuracies for the individual approaches without such combination.

SUMMARY OF THE INVENTION

These needs are met by the invention, which combines a GPS with an altimeter or other location-indicating instrument and provides a procedure for combination or integration of measurements made using these two systems to provide better availability or accuracy of two-dimensional and/or three-dimensional location coordinates than with the GPS-determined location coordinates alone or the other instrument's location coordinate(s) alone.

The invention combines measurements of altitude or elevation with GPS-based determination of location to provide accurate location coordinates for a GPS receiver, when GPS signals received from a satellite are noisy or purposely compromised (e.g., because of signal adjustment by Selective Availability, denoted "SA", imposed by the U.S. government), or when the GPS satellite signals received are insufficient in number to allow determination of the desired number of location coordinates. Imposition of SA signal adjustment typically degrades GPS accuracy from the range 0.1–10 meters to 50–200 meters. An altimeter, barometer or other altitude sensor can provide altitude or elevation information that is accurate to within 10–20 meters, depending upon the time elapsed since the last calibration, the quality of the last calibration and the local rate of change of barometric pressure. When only two location coordinates can be determined from the available GPS information, an altimeter will provide a more accurate determination of altitude or elevation and can provide an estimate of horizontal coordinates with improved accuracy for this location, if a local topographic map is also used. Even where SA signal adjustment is not present, the relative accuracy of a pure GPS-based location determination may be insufficient, and an altimeter or other altitude sensor can often provide more accurate information on a single location coordinate. This is especially true where GPS signals from at most three GPS satellites are available so that unambiguous three-dimensional location coordinates cannot be determined. The altimeter signals can be combined with the GPS signals, using the PDOP or VDOP parameter for the satellite constellation as a criterion for use of one or the other of these altitude-determining signals.

If the calibration variance of the altimeter is lower than the satellite ranging variance for GPS signals, the calibrated altimeter can provide a better estimate of altitude than can the GPS-determined altitude. If the calibration variance of the altimeter is about the same as the satellite ranging variance, when selective availability is subsequently activated the calibrated altimeter can provide better availability of, and accuracy for, the measured altitude when the true altitude changes by an amount larger than the SA standard deviation $\sigma_{SA}$. Accuracy of the horizontal location coordinates is also improved, when the true altitude changes by an amount greater than $\sigma_{SA}$, because a better estimate of nominal altitude is used in computing these horizontal coordinates.

DESCRIPTION OF BEST MODE OF THE INVENTION

Figure 1:
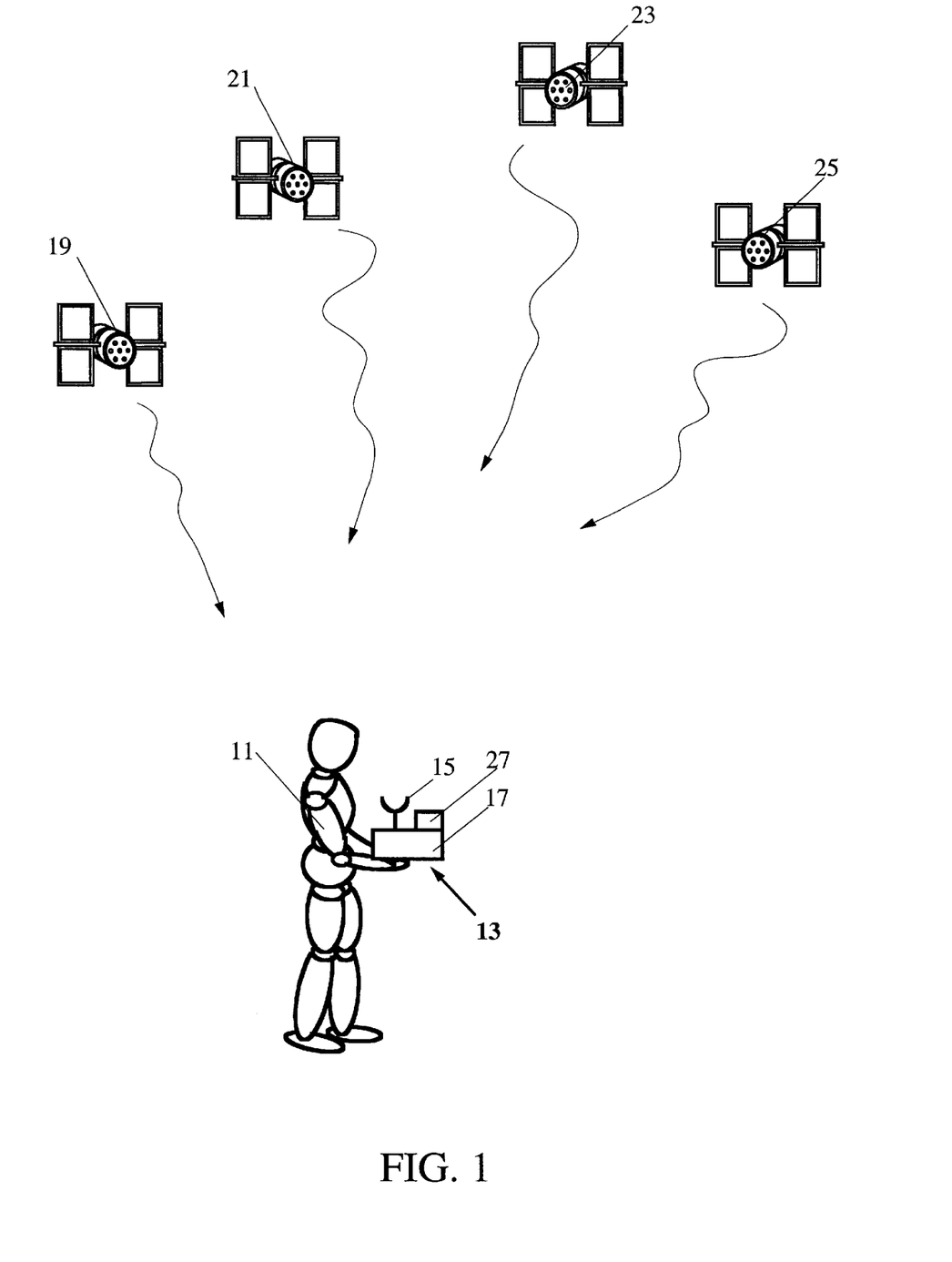
FIG. 1 illustrates use of the invention in a representative environment.

In FIG. 1, a surveyor, navigator or other human or non-human user 11 of a location determination system carries a Satellite Positioning System (SATPS) location determination module 13 that includes an SATPS signal antenna 15 and associated SATPS signal receiver/processor 17 that receive and process SATPS signals from three or more SATPS satellites 19, 21, 23, 25. The SATPS may be a Global Positioning System (GPS), a Global Orbiting Navigation Satellite System (GLONASS), both discussed below, or a similar satellite-based location determination system. For convenient reference, the location determination system used here will be referred to as a GPS, but the invention covers use of other SATPSs as well. The GPS receiver/ processor 17 receives these signals and, using analysis of either the code phase or carrier phase signals, initially determines the location coordinates of the GPS antenna 15 in a special coordinate system, such as the WGS 84 datum or the nearly-equivalent NAD 83 datum, which are discussed by Alfred Leick in *GPS Satellite Surveying*, John Wiley & Sons, New York, Second Edition, 1995, pp. 215–232, 410–429 and 486–499, the information from this material being incorporated by reference herein.

If the broadcast ephemeris data and data corrections are used for computing location coordinates directly, GPS locations and vectors may be referenced to the WGS 84 datum, which provides a global coordinate system S1. The WGS 84 datum begins with a geoid, a two-dimensional surface that approximates the Earth's surface but is continuously differentiable so that a surface normal is defined and is continuous everywhere on the geoid surface. The direction of this surface normal is parallel to the local direction of total gravity (normal gravity plus the centrifugal effect of the Earth's rotation about its rotational axis). The particular geoid chosen here is a "best fit" in some minimization sense to average sea level on the Earth. This geoid has some bulges inward and outward, especially near mountain ranges, and cannot be accurately defined mathematically by any series with a reasonable number of terms. This geoid is, therefore, approximated by an oblate ellipsoid of revolution, rotated about its minor axis, which is parallel to the Earth's rotational axis. This ellipsoid, referred to as the geo-ellipsoid here for convenient reference, is slightly flattened at its poles relative to the ellipsoid's equator, reflecting the Earth's polar flattening due to rotation and other phenomena. The WGS 84 geo-ellipsoid has a semimajor axis length a, semiminor axis length b and flattening factor f related by $$a = 6378.137 \text{ km}, \quad (1)$$

$$f = (a-b)/a = (298.257223563)^{-1}. \quad (2)$$

Figure 2A:
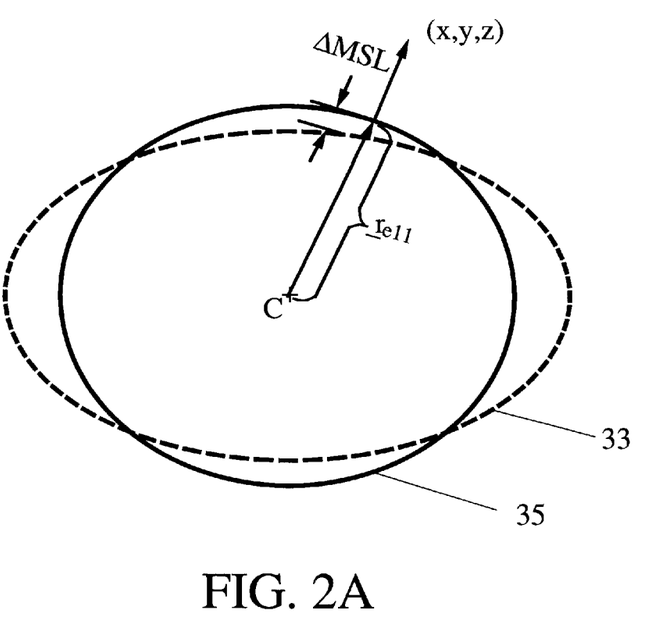
FIGS. 2A and 2B illustrate the relation between mean sea level and a geodetic reference ellipsoid that approximates the Earth's surface.
Figure 2B:
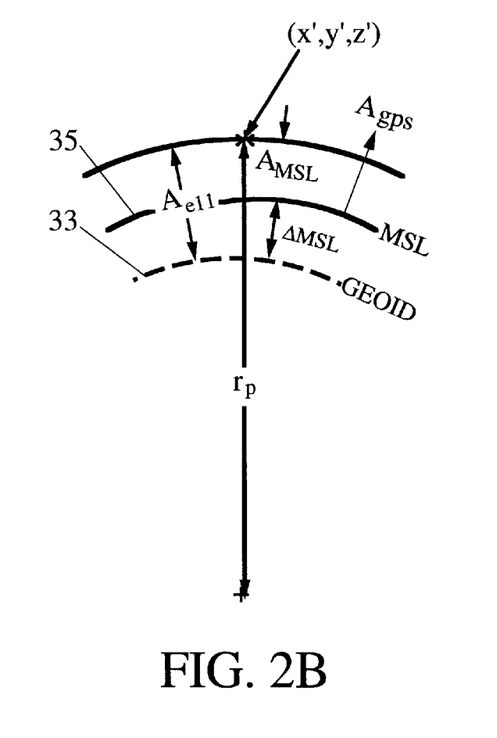

The geo-ellipsoid adopted by the NAD 83 datum, which is used primarily for civil surveying activities, has the same semimajor axis length but has a slightly different flattening factor, $f = (298.257222101)^{-1}$. FIGS. 2A and 2B illustrate the relationship of a representative geo-ellipsoid surface 33 that approximates the geoid, and a two-dimensional surface 35 representing the mean sea level (MSL) on the Earth. FIGS. 2A and 2B also show the signed distance or height $$\Delta MSL(x',y') = A_{msl}(x',y') - A_{ell}(x',y') \quad (3)$$

of the MSL surface 35 above the geo-ellipsoid surface 33 for a given location, prescribed by a coordinate pair (x',y'), on the MSL surface.

A surveyor, navigator or other user of a satellite-based location determination system will often record locations with reference to a local coordinate system S2 in which the location coordinates may be (North, East, Elevation) or (latitude, longitude, altitude) (often abbreviated as "(lat, lon, alt)"). The coordinate system S2 may be only locally defined, because vectors representing directions such as "North", "East" and/or "Elevation" may vary with a meridional angular coordinate, such as longitude, and with the distance of some local monument or other reference point from the equator (measured by latitude).

The user 11 in FIG. 1 also carries an altimeter, barometer or other altitude-sensing device 27 that communicates with the GPS receiver/processor 17. A measurement from the altitude sensor has the same formulation as the altitude measurement used in a two-dimensional location solution, except that the current altitude from the altitude sensor 27 is used and is allowed to vary, rather than being held fixed at the last GPS-determined altitude. In this way, if the true altitude changes, this altitude change will be observed in the altitude sensor 27, and the location coordinate solution behaves as a three-dimensional location solution. If the altitude used in a two-dimensional GPS location is fixed at the last value of that altitude, and if the altitude sensed by the altimeter is not used in the (linearized) location solution but is simply added after a two-dimensional, horizontal location fix is obtained, this two-dimensional location fix will degrade as the true altitude changes further. However, if the true altitude is used in a (linearized) location solution, an update in the horizontal location fix will have no bias arising from use of the wrong altitude in this solution: The accuracy of the location solution is maintained when the altitude changes. Improvement of the accuracy of the altitude or vertical coordinate improves the accuracy of the other coordinates as well. This is a key point of the invention.

Assume that the altitude sensor 27 supplies the sensor altitude with respect to the mean-sea-level (MSL) surface 35 shown in FIGS. 2A and 2B. The coordinate frame is arbitrary, because a transformation from any other coordinate frame can always be performed to obtain the altitude relative to MSL. The altitude sensor 27 can provide continuous or discrete measurements. Without loss of generality, the altitude measurement is assumed to be available from the sensor at some minimum rate $f_a$ with the corresponding period $T_a = 1/f_a$, which produces altitude estimates at about the same rate and time epoch as for the GPS measurements. Thus, the altitude sensor 27 provides an independent estimate of the altitude at each of a sequence of measurement timest $t_k (t_0 < t_1 < t_2 < \ldots )$. Generally, the altitude measured $z_{alt}$ by the altitude sensor 27 will be a sum of the true altitude plus one or more error terms $$z_{alt}(t_k) = A(t_k) + B(t_k) + Q(t_k), \quad (4)$$

where $A(t_k)$ is the true altitude at time $t_k$, referenced to the MSL surface, $B(t_k)$ is the bias-like sensor measurement error at time $t_k$, and $Q(t_k)$ is sensor noise error. Ideally, the errors $B(t_k)$ and $Q(t_k)$ would be zero, and the altitude sensor 27 would contribute no error to the altitude estimate.

Thus, the altitude sensor error generally contains two error components. The dominant error component $B(t_k)$ is generally a bias-like error, having a long time constant and changing very slowly. For example, many altimeters use barometric pressure to estimate altitude. The changing weather conditions would cause the bias-like error to change over the course of a day or over different regions of high or low pressure. The second error component $Q(t_k)$ has a short time constant and is due to Gaussian measurement noise error and quantization error that can occur, for example, when the sensor output is converted to the digital domain via an analog-to-digital (A/D) converter.

For the measurement to be useful, one must calibrate the sensor 27 by estimating the mean of the sensor error $B(t_k)$. This is generally done by forming the difference between the sensor altitude and an altitude generated by an independent measurement, such as a measurement by GPS or another location determination system. The estimate of the bias error is then removed from the altimeter output value to produce a calibrated altimeter value. This approach is followed in the embodiments discussed below.

The notation used for this calibration procedure is as follows. First define a reference altitude measurement according to $$z_{ref}(t_k) = A(t_k) + G(t_k), \quad (5)$$

where $z_{ref}(t_k)$ is a sum of the true altitude $A(t_k)$ plus a zero-mean additive error $G(t_k)$ in this reference altitude measurement. The sensor calibration is performed at a time $t=t_{cal}$ by forming the difference between the two independent altitude measurements.

$$C(t_{cal}) = z_{alt}(t_{cal}) - z_{ref}(t_{cal}) \quad (6)$$
$$= B(t_{cal}) + Q(t_{cal}) - G(t_{cal}).$$

If $Q(t_{cal})$ and $G(t_{cal})$ each has zero mean, the quantity $C(t_{cal})$ provides an estimate of the altimeter bias error, because $$E[C(t_{cal})] = B(t_{cal}), \quad (7)$$

where $E[u]$ denotes the expected value of the statistical variable u.

The calibrated sensor value is obtained for subsequent times $t=t_k$ ($t_k > t_{cal}$), until a new calibration value is available, by subtracting the calibration $C(t_{cal})$ from the raw sensor output value to produce an altitude estimate $A_{est}$ for which the bias is removed, viz.

$$A_{est}(t_k) = z_{alt}(t_k) - C(t_{cal}). \quad (8)$$

A second feature of the invention is the observation that the altitude sensor information primarily operates exclusively in a calibration mode or in a navigation mode, where the navigation solution is used to calibrate the sensor 27. When the altitude sensor 27 operates in the calibration mode, the altitude sensor measurement error is estimated, and the sensor is not used in the location solution. When the sensor operates the navigation mode, the current raw altitude measurement is compensated with the latest estimate of the altitude sensor measurement error. The compensated altitude measurement, which is assumed to be free of the majority of the measurement error, is then used in the location solution to provide a measurement of altitude.

The relative amount of time spent in either the calibration mode or the navigation mode will depend on the accuracy and stability of the altitude sensor 27 and on the availability of three-dimensional location solutions from GPS satellite data. The altitude sensor 27 is used (in navigation mode) when the estimated altitude error of the calibrated altimeter is less than the estimated altitude error using only GPS. Thus, in some implementations, prior information on sensor accuracy and GPS measurement error is used to estimate the inaccuracies of the calibrated sensor altitude and of the GPS-only altitude.

In a different application, it may be desirable to provide a smooth transition between the GPS-determined altitude and the sensor-determined altitude. In this situation, the altitude sensor error is estimated as the difference between the sensor output altitude and the latest GPS-determined altitude. Here, the error in the sensor-estimated altitude is dominated by the altitude error of the last GPS-determined altitude, and the calibrated altitude will provide a more accurate indication of altitude change or relative altitude than will the GPS-determined altitude. One such approach for providing this transition is discussed later, in connection with Eqs. (21) and (22).

In another application, the user 11 may supply an accurate altitude measurement to the GPS receiver/processor 17 at a selected time. This can occur when the user is near a road or trail sign that accurately reports the current altitude, referred to as a "trailhead value". This reported altitude can be used to calibrate the altitude sensor 27 or to estimate the altitude sensor error, by subtracting the reported or trailhead altitude from the sensor-indicated altitude.

These last two techniques provide excellent methods of measuring relative altitude changes, because the altitude sensor accurately senses relative altitudes or altitude differences. Otherwise stated, many altitude sensors of the same type will not necessarily provide the same altitude output value, but will generally indicate the same change or difference in altitude when the altitude of the sensor changes.

In another application, the user 11 is only interested in changes in altitude relative to a given location. The receiver will calibrate the altitude sensor 27 with respect to any reference altitude value, obtained just before the time the sensor was used for navigation, and the receiver/processor 17 will report altitude changes relative to the reference altitude used for calibration. This approach will provide good altitude values relative to the reference altitude.

Some approaches are presented here that illustrate techniques that can be used to calibrate an altitude sensor. In a first technique, only a single measurement is used for a single calibration of the sensor 27. In this instance, the reference altitude may be the last three-dimensional, GPS-determined altitude, or may be a user-supplied altitude, such as a trailhead altitude value. The estimate of the altitude sensor error is then the difference between the altitude sensor measurement and the reference altitude. This estimated error is subtracted from the altitude sensor output value in subsequent altitude sensor measurements to generate a compensated altitude measurement used for surveying or navigation.

In a second technique, a sequence of GPS-determined altitude estimates is used to calibrate the sensor 27. In this situation, the user 11 recognizes that most of the errors in the sensor-determined altitude and in the GPS-determined altitude have zero mean random components that can be reduced through signal averaging or filtering. Thus, the difference, or residual, between the sensor-measured altitude value and the GPS-determined altitude is formed and is blended with the previous estimate of the altitude sensor bias $B(t_n)$, using a selected scalar blending factor.

This technique is general and includes all scalar Kalman filters and fixed gain filters that reduce to a first order low-pass filter. Typically, the filter gain ($K_n$) on the new residual depends on the variance of the last altitude calibration and on the variance of the current residual, which includes the variance of the sensor noise and the error of the GPS-determined altitude. Kalman filtering is discussed by R. G. Brown and P. Hwang in *Random Signal Analysis and Kalman Filtering,* John Wiley & Sons, Second Edition, 1995, especially pages 409–455, the information in this material being incorporated by reference herein.

Kalman filtering can be used to combine the altitude sensor values and the vertical coordinate measurements from the GPS. A one-state model is developed here for illustrative purposes. The statistical variable used here is $$C(t) = z_{alt}(t) - z_{ref}(t) = B(t) + Q(t) - G(t) \quad (9)$$
$$= x^\wedge + v1 + v2, \quad (10)$$

from Eqs. (6) and (7). Here, $x^\wedge = B(t)$ is a (one-dimensional) state vector, and $v1 = Q(t)$ and $v2 = -G(t)$ are zero-mean, normally distributed, statistically independent variables with variances $\sigma_Q^2$ and $\sigma_G(t)^2$, respectively. The dynamics of the transformation process are contained in a 1-by-1 transformation matrix H (which may be an identity matrix I or a scalar 1), with covariance matrix entry $R(t)=\sigma_Q^2+\sigma_G(t)^2$. The initial conditions for the process are given by $x_0^{\wedge}$ (initial estimate of x)=$P_0^-$ (initial uncertainty vector)=some very large number, such as $10^4$ meters. The (one-dimensional) Kalman gain matrix $K_k$ at the kth step in the sequence becomes $$K_k = P_k^-/(P_k^- + R_k), \quad (11)$$

where $P_k^-$ and $R_k$ are the projected values of P(t) and R(t) at $t=t_k$. At the kth step in the process, the updated state vector becomes $$\begin{aligned} x^{\wedge}_k &= x^{\wedge}_k{}^- + K_k(C_k - H_k x_k^-) \\ &= x^{\wedge}_k{}^- + K_k(C_k - x^{\wedge}_k{}^-) \\ &= (I - K_k) x^{\wedge}_k{}^- + K_k C_k. \end{aligned} \quad (12)$$

A new propagation matrix $P_k$ is defined by the relation $$P_k = (I - K_k) P_k^-, \quad (13)$$

and the propagation equation becomes $$P_{k+1}^- = P_k + D_k, \quad (14)$$

where $D_k$ is the drift variance between consecutive updates of the vector $x^{\wedge}$. Here, the following correspondences can be made:

$$\sigma_{cal}(t_k)^2 \Leftrightarrow P_k,$$

$$C(t_k) \Leftrightarrow x^{\wedge}_k{}^- = B_{est}(t_k),$$

where $\sigma_{cal}(t_k)^2$ is the error variance for the calibration. An estimate of altitude can then be written $$A_{est}(t) = z_{alt}(t) - C(t_k) (t > t_k). \quad (15)$$

After an altitude sensor 27 has been used exclusively to determine the vertical coordinate $z_{alt}(t)$ of a GPS station over a long time interval, this altimeter-supplied vertical coordinate value may have drifted away from the true vertical coordinate value by a large distance. When the system has operated in a navigation mode for a considerable time (after a calibration value is determined by another measurement, such as GPS) and then switches back to calibration mode, use of a large value for the drift variance $D_k$ may be required to cause the new vertical coordinate to converge quickly to the true or calibrated value of this variable.

A second, simpler approach also yields an estimate of the calibrator variance. Equations (6) and (7) are again the starting points, and a recursive estimate of the new value for the variable $$C(t) = z_{alt}(t) - z_{ref}(t) = B(t) + Q(t) - G(t) \quad (16)$$

is developed by use of the propagation equations $$C_f(t_n) = (1 - K_n) C(t_{n-1}) + K_n z_{alt}(t_n), \quad (17)$$

$$K_n = \max[1/n, 1/N_{max}]. \quad (18)$$

for the filtered value $C_f$ of the variable C, where n is the number of times the filtered value has been updated and $N_{max}$ is a selected positive number. A recursive estimate for an upper bound for the variance of the error variable $C_f(tn)$ can be expressed as $$\sigma_C(t_n)^2 = (1-K_n)^2 \sigma_C(t_{n-1})^2 + (K_n)^2 \sigma_z(t_n)^2 = \sigma_{cal}(t_n)^2. \quad (19)$$

The altitude estimate, after calibration at $t=t_n$, becomes $$A_{est}(t) = z_{alt}(t) - C_f(t_n) (t \geq t_n). \quad (20)$$

The gain on the previous calibration value is one minus the residual gain factor, as indicated above, so that the mean value of the filter is unbiased; that is, both components are estimates of the sensor bias. After the filter is initialized, the filter gain $K_n$ is required to be no greater than unity and no less than a selected minimum value $K_{min}$ so that the gain does not become too small.

These techniques can be used mutually exclusively or in combination, depending on how the relative inaccuracies of the two altitude calibration sources are weighted. For example, a user-entered altitude could be weighted by a multiplier according to the expected inaccuracy of the current calibration, using weight coefficients such as $$\begin{aligned} w(gps) &= c_1 \sigma_{gps}(t_k) q / [c_2 \sigma_{alt}(t_k)^p + c_1 \sigma_{gps}(t_k)^q] \\ &= 1 - w(\text{altimeter}), (t \geq t_k) \end{aligned} \quad (21)$$

$$A_{est}(t) = w(gps) z_{gps}(t) + (1 - w(gps)) z_{alt}(t), \quad (22)$$

where p and q are selected non-negative exponents, such as p=2 and/or q=2, and $c_1$ and $c_2$ are selected non-negative weight coefficients. In another approach, Eq. (22) is used with general weight coefficients not necessarily defined by Eq. (21)), the weight coefficient w(gps)=w(t;gps) tends monotonically toward 1 (with the passage of time t) if $\sigma_{gps}(t) < \sigma_{alt}(t) + \Delta z_1$, and the weight coefficient w(t;gps) tends monotonically toward 0 if $\sigma_{gps}(t) > \sigma_{alt}(t) + \Delta z_2$, where $\Delta z_1$ and $\Delta z_2$ ($\geq \Delta z_1$) are selected constants that may be positive, negative or zero.

If the user calibration inaccuracy is much lower than the estimated inaccuracy of the GPS-determined location, the user-entered altitude would be weighted more heavily. Otherwise, the user calibration would be blended more evenly with the previous calibration estimate. Apart from the fixed choices of exponents and weight coefficients, these weights are determined only by the statistical inaccuracies associated with the GPS and altitude sensor output signals. Equations (21) and (22), or Eq. (22) alone, can be used to provide a transition, discussed earlier, between the GPS-determined altitude and the sensor-determined altitude.

The equations for using the altitude measurement in the GPS location fix are presented here. The two-dimensional GPS-only and three-dimensional GPS-only location fixes are presented, to illustrate differences between each of these location fixes and a three-dimensional location fix that uses the altitude sensor 27.

A. Three-dimensional Location Solution.

Assume that a measurement is taken at a time $t=t_k$ and that an ECEF coordinate frame is used. A typical measurement of pseudorange $\rho_i$ yields $$\rho_i = r_i + b + e_i, \quad (23)$$

$$r_i = [(x-x_i)^2 + (y-y_i)^2 + (z-z_i)^2]^{1/2} = \text{"true range"}, \quad (24)$$

where $(x_i, y_i, z_i)$ are the known location coordinates of the ith satellite in the ECEF frame, (x,y,z) are the unknown location coordinates of the receiver antenna in the ECEF frame, b is the unknown user clock bias, and $e_i$ represents other unknown measurement errors, at time $t=t_k$, for satellite i.

Because Eq. (24) is a non-linear equation in the unknowns x, y and z, the measurements are linearized about a nominal location $(x_n, y_n, z_n)$. This linearization process can be repeated until the net change in the estimate is smaller than some selected threshold, at which time no further estimates of the location are made. A first-order approximation for the measurement is formed by using the relations $$r(x,y,z) \approx r_n(x_n,y_n,z_n) + (\partial r_n/\partial x)\Delta x + (\partial r_n/\partial y)\Delta y + (\partial r_n/\partial z)\Delta z \quad (25)$$

$$x \approx x_n + \Delta x, \quad (26)$$

$$y \approx y_n + \Delta y, \quad (27)$$

$$z \approx z_n + \Delta z. \quad (28)$$

The linearized pseudorange differential $\Delta \rho_{in}$ is the difference between the actual and expected measurements at the nominal location, viz.

$$\begin{aligned}\delta\rho_{in} &= \rho_i - \rho_{in} \\ &= (x_n - x_i)\Delta x/r_{in} + (y_n - y_i)\Delta y/r_{in} + (z_n - z_i)\Delta z/r_{in} + b + e_i,\end{aligned} \quad (29)$$

where $\rho_{in} = r_{in}$ is the estimated range using the nominal location and the ith satellite. This yields a linearized system of four equations (pseudorange differentials from four satellites) in four unknowns, which can be written in matrix form as $$Y = H_{3D} X, \quad (30)$$

$$Y = \begin{bmatrix} \delta\rho_{1n} \\ \delta\rho_{2n} \\ \delta\rho_{3n} \\ \delta\rho_{4n} \end{bmatrix}, \quad (31)$$

$$X = \begin{bmatrix} \Delta x \\ \Delta y \\ \Delta z \\ b \end{bmatrix}, \quad (32)$$

$$H_{3D} = \begin{bmatrix} U_{x1} & U_{y1} & U_{z1} & 1 \\ U_{x2} & U_{y2} & U_{z2} & 1 \\ U_{x3} & U_{y3} & U_{z3} & 1 \\ U_{x4} & U_{y4} & U_{z4} & 1 \end{bmatrix}, \quad (33)$$

$$U_{xi} = (x_n - x_i)/r_{in} \quad (i = 1, 2, 3, 4), \quad (34)$$

$$U_{yi} = (y_n - y_i)/r_{in}. \quad (35)$$

$$U_{zi} = (z_n - z_i)/r_{in}. \quad (36)$$

The four quadruples $(U_{xi}, U_{yi}, U_{zi}, 1)$ are assumed to be linearly independent. The matrix $H_{3D}$ is therefore invertible, and the solution of Eq. (30) becomes $$X = H_{3D}^{-1} Y. \quad (37)$$

The complete estimated location solution $(x_p, y_p, z_p)$ is the sum of the nominal position plus the corrections computed in Eq. (37), viz.

$$x_p = x_n + \Delta x, \quad (38)$$

$$y_p = y_n + \Delta y, \quad (39)$$

$$z_p = z_n + \Delta z. \quad (40)$$

The altitude, measured relative to the MSL surface 35, of the GPS antenna is computed in two steps from the estimate of the location solution coordinates $(x_p, y_p, z_p)$ in an ECEF system. The coordinates $(x_p, y_p, z_p)$ are first converted to latitude, longitude and altitude above the geo-ellipsoid surface 33. Next, the altitude above this geo-ellipsoid surface is converted to height above the MSL surface 35 with a look-up table that generates the elevation difference between the geo-ellipsoid surface 33 and the MSL surface 35. This table is quantized according to the local latitude and longitude coordinates to yield a number AMSL that represents the elevation difference between the MSL surface 35 and the geo-ellipsoid surface 33. The following relation is used in these computations:

$$A_{gps} = A_{wgs} - \Delta_{MSL}, \quad (41)$$

$$\Delta_{MSL} = Alt(MSL) - A_{wgs}, \quad (42)$$

where $A_{gps}$ represents the GPS-determined altitude relative to the MSL surface 35. This altitude $A_{gps}$ can be used for calibration with the altitude sensor as discussed above.

In order to enter a two-dimensional mode, as discussed below, it is important to compute and preserve another parameter $r_s$, which is the difference between the magnitude $r_p$ of the vector from the Earth's center to the GPS user antenna and the computed altitude $A_{gps}$, viz.

$$r_s = r_p - A_{gps}. \quad (43)$$

where $$r_p = [x_p^2 + y_p^2 + z_p^2]^{1/2}, \quad (44)$$

The relationship between these variables is illustrated in FIG. 2B.

B. Two-dimensional Location Solution.

In order to use an altitude measurement from the altitude sensor, or the last altitude if the receiver is in the altitude hold mode, a (fictitious) measurement is generated representing the range from the antenna to a fictitious satellite located at the Earth's center. The satellite range measurement is generated by adding the desired altitude to the surface radius. This surface radius is available from the last three-dimensional location fix or can be computed from the nominal location used in the two-dimensional fix. See Eq. (43). The desired altitude can be specified by the user or can be determined from the altitude sensor measurements. The true range r of the present location from the center C of the Earth is $$r = r_s + A, \quad (45)$$

where $r_s$ is the distance from the origin to the MSL surface 35 at the present location and A is the true altitude above the MSL surface in the location solution. An estimate of this true range r is provided by the relation $$r_{est} = r_s + A_{est}. \quad (46)$$

The true range r from the present location to the fictitious satellite with coordinates $(x_c, y_c, z_c) = (0,0,0)$ is defined by the relation $$r = [(x-x_c)^2 + (y-y_c)^2 + (z-z_c)^2]^{1/2}. \quad (47)$$

This equation is nonlinear in the location variables (x,y,z) and is linearized about the nominal location coordinates $(x_n, y_n, z_n)$ by use of the same technique as used above in Eqs. (23) and (24), viz.

$$\delta r_n = r - r_n \qquad (48)$$
$$\approx x_n(\Delta x/r_n) + y_n(\Delta y/r_n) + z_n(\Delta z/r_n),$$

where $$r_n = [x_n^2 + y_n^2 + z_n^2]^{1/2}. \qquad (49)$$

A correction $\delta r_n$ for the true range can be estimated by the relation $$\delta r_n = r_s + A_{est} - r_n. \qquad (50)$$

This measurement, combined with GPS measurements from three GPS satellites, produces a system of equations that can be written in matrix form as $$Y_n = H_{2D} X_n, \qquad (51)$$

where $$Y_n = \begin{bmatrix} \delta \rho_{n1} \\ \delta \rho_{n2} \\ \delta \rho_{n3} \\ \delta r_n \end{bmatrix}, \qquad (52)$$

$$X_n = \begin{bmatrix} \delta x \\ \delta y \\ \delta z \\ b \end{bmatrix}, \qquad (53)$$

$$H_{2D} = \begin{bmatrix} U_{x1} & U_{y1} & U_{z1} & 1 \\ U_{x2} & U_{y2} & U_{z2} & 1 \\ U_{x3} & U_{y3} & U_{z3} & 1 \\ U_{xc} & U_{yc} & U_{zc} & 0 \end{bmatrix}, \qquad (54)$$

$$U_{xi} = (x_n - x_i)/r_{in}, \qquad (55)$$
$$U_{yi} = (y_n - y_i)/r_{in}, \qquad (56)$$
$$U_{zi} = (z_n - z_i)/r_{in}, \qquad (57)$$
$$U_{xc} = x_n/r_n, \qquad (58)$$
$$U_{yc} = y_n/r_n, \qquad (59)$$
$$U_{zc} = z_n/r_n. \qquad (60)$$

Three degrees of freedom exist. A solution of Eq. (51) exists and can be written as $$X_n = (H_{2D})^{-1} Y_n, \qquad (61)$$

if an inverse $(H_{2D})^{-1}$ exists for the matrix $H_{2D}$. The matrix $H_{2D}$ is invertible if the three satellites corresponding to i=1, 2 and 3 are not collinear.

In order to maintain accuracy of the computed horizontal location coordinates, it is important to use the best available estimate of present altitude in such computations. If one merely uses the last three-dimensional altitude from GPS in the subsequent computations, as done in the Masumoto patent, op. cit., as the vehicle altitude changes, the accuracy of the horizontal location coordinates will degrade or diverge from the true values of the horizontal location coordinates. This divergence is roughly proportional to the change in altitude experienced by the vehicle after the last accurate altitude estimate was used. In the Masumoto patent, the controller receives altitude data from the sensor and altitude data from the GPS as independent quantities. An improved estimate of altitude is never returned to or used by the GPS receiver/processor 17. In the invention disclosed here, the improved estimate of altitude is always returned to and used by the GPS receiver/processor, as indicated in Eq. (50).

Techniques are presented here for generating continuous altitude information where the altitude information is sometimes provided by GPS, when a good three-dimensional PDOP is available for the satellite constellation, and at other times is provided by the altitude sensor, when three GPS satellites are available and the altitude measurement has a better associated VDOP value. Whenever this type of mode switching occurs, discontinuities can occur between the two sources of altitude values. This can occur when the calibration has a large error, or when the altitude sensor is used for navigation during a long time interval without recalibration and the sensor bias changes. Several solutions and strategies are available for dealing with these problems.

First, the altitude sensor 27 can be used to supply the altitude measurement in navigation mode at all times. The user 11 could be required to enter a reference altitude initially to calibrate the sensor 27, or the first three-dimensional GPS location, or a short sequence of three-dimensional location fixes, could be used to calibrate the sensor. No discontinuities would occur because the altitude sensor 27 is inherently analog and cannot manifest large jumps.

Second, a simple low-pass filter could be used on the altitude solutions computed in a three-dimensional location fix that is provided either by a GPS-only three-dimensional location fix or by a three-dimensional location fix obtained using the altitude sensor values and other measured values. Proceeding in this manner, continuity of the reported altitude can be guaranteed even when mode switches occur between GPS-determined altitude and sensor-supplied altitude. Third, the first and second techniques could be used together.

The altitude sensor reading A can be calibrated by several different approaches. First, the GPS signals (only) can be filtered. Second, the latest GPS altitude coordinate can be used, for relative calibration only. Third, the GPS-supplied altitude and the sensor-supplied altitude can be combined in a linear combination using (1) fuzzy logic or (2) Kalman filtering techniques or (3) weighting coefficients that depend only on estimates of the respective statistical inaccuracies of the individual altitude estimates, as done in Eqs. (21) and (22). Fourth, if an independent estimate of altitude is available, for example, from a local signpost or a weather radio broadcast, this estimate can be used to provide a trailhead altitude value to determine the GPS-determined altitude error or the altitude sensor error.

If absolute accuracy is of importance, Differential GPS (DGPS) can be used to calibrate the altitude error. If DGPS is used for calibration, certain GPS measurement errors, which are common to all GPS receiver/processors 17, are measured by a non-moving receiver or reference station at a known location. These measured errors are then communicated to other receiver/processors so that these errors can be removed. In this way, the measurement errors can be reduced to a level that ensures use of very accurate DGPS-determined altitude estimates. The accuracy of the altitude value used for calibrating the sensor 27 is then enhanced. Also, an altitude sensor 27 in which the bias error is very stable, or close to zero, can be used to improve the accuracy and stability of the sensor derived altitude measurements used in the navigation mode.

Several quantitative approaches are available here, where the goal is to minimize the inaccuracies associated with the elevation or vertical coordinate z. In a first approach, one begins with the (dimensionless) position dilution of precision $$PDOP(t_n) = [(HDOP(t_n))^2 + (VDOP(t_n))^2]^{1/2}, \quad (62)$$

where $HDOP(t_n)$ and $VDOP(t_n)$ are the horizontal and vertical components of the PDOP value for a location fix at time $t=t_n$, calculated from the present configuration of the satellites that would be used for the location fix. The estimated horizontal and vertical inaccuracies, expressed in the usual length units, become $$\text{horiz inacc}(t_n) = HDOP(t_n)\sigma_\rho(t_n), \quad (63)$$

$$\text{vert inacc}(t_n) = VDOP(t_n)\sigma_\rho(t_n), \quad (64)$$

where $\sigma_\rho(t_n)$ is the present estimated standard deviation of the pseudorange error at time $t_n$ in appropriate length units. Assume that the altitude sensor 27 was previously calibrated with a single GPS-determined altitude at a time $t=t_i$. The calibration error variance is given by $$\sigma_{cal}(t_i)^2 = VDOP_{cal}(t_i)^2 \sigma_\rho(t_i)^2 + \sigma_Q^2, \quad (65)$$

where $VDOP_{cal}(t_i)$ is the estimated (dimensionless) VDOP inaccuracy for the GPS-only vertical solution, and Q is the sum of noise error and quantization or resolution error for the altitude sensor readout. The statistical variance for the calibrated altimeter inaccuracy for a subsequent time $t>t_i$ is given approximately by $$\sigma_{cal}(t)^2 \approx \sigma_{cal}(t_i)^2 + \sigma_{drift}(t_i)^2 (t-t_i), \quad (66)$$

where it is assumed that $\sigma_{drift}(t_i)^2$ can be estimated from other measurements. The variance for the calibration will degrade with time because of changes in temperature, in the atmospheric conditions and in the altitude sensor itself. The elevation provided by the altimeter and by the vertical coordinate for a GPS location fix, and the difference between these values are expressed, as before, by Eqs. (4), (5) and (6), where B(t) is the slowly varying bias for the altimeter sensor. The mean value of C(t) is equal to B(t), and the variance for C(t) becomes $$\sigma_{cal}(t_{cal})^2 = \sigma_{v,gps}(t_{cal})^2 + \sigma_Q^2. \quad (67)$$

Here, the noise/quantization error Q(t) is uniformly distributed, with zero mean and variance $\sigma_Q^2$; the error G(t) is normally distributed, with zero mean and variance $\sigma_{v,gps}(t)^2$; and the error variables Q and G are independent of each other. where $e_{us,i}$ is the unit length vector $e_{us}$, determined from the location of the ith station, and $v_i$ is noise present in the measurement of the pseudorange. Each measurement z is related to the pseudorange filter states x, using a 4×L transformation matrix H, by the relations $$z_{pr} = Hx + v, \quad (43)$$

$$h_{i1} = \partial z_i / \partial x_1 = e_{us,i} \cdot e_c, \ (i=1, \ldots, L) \quad (44)$$

$$h_{i2} = \partial z_i / \partial x_2 = e_{us,i} \cdot e_d, \quad (45)$$

$$h_{i3} = \partial z_i / \partial x_3 = e_{us,i} \cdot e_r, \quad (46)$$

$$h_{i4} = -1, \quad (47)$$

$$v_k = 4 \times 1 \text{ measurement noise vector at time } t_k, \quad (48)$$

$$R_k = E[v_k v_k^{tr}]. \quad (49)$$

Equation (43) may also be written as a sequence of scalar equations for an individual (scalar) measurement $z_{pr}$ for a selected station.

Transitions between the filter states are described by the relations $$x_k = \Phi_k x_{k-1} + w_k, \quad (50)$$

where $\Phi_k$ is the state transition matrix, which can be modeled here as the 4×4 identity matrix, and $w_k$ is a noise vector with covariance matrix $$Q_k = E[w_k w_k^{tr}]. \quad (51)$$

The covariance matrix $P_k = E\{x_k x_k^{tr}\}$ of the filter states propagates according to the relation $$P'_k = \Phi P_{k-1} \Phi^{tr} + Q_{k-1}, \quad (52)$$

and the primed value $P'_k$ represents the covariance matrix $P_k$ before the new measurement is incorporated (obtained by propagation from the preceding state).

Measurements are incorporated by the relations $$x_k = x'_k + K_k(z_k - H_k x'_k), \quad (53)$$

$$x'_k = \Phi_k x_{k-1}, \quad (54)$$

$$K_k = P'_k H_k^{tr} [H_k P'_k H_k^{tr} + R_k]^{-1} = \text{Kalman gain matrix}. \quad (55)$$

Figure 3:
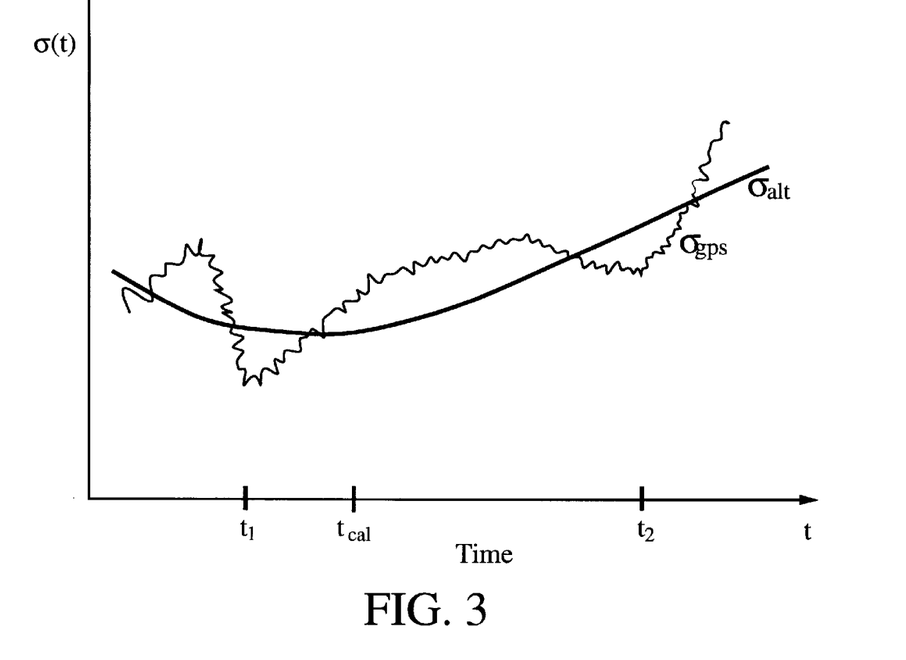
FIG. 3 graphically compares the values of vertical coordinate error associated with GPS measurements and with altimeter measurements in a typical situation.

Switching between use of the altitude sensor readout $z_{alt}(t)$ and use of the GPS-determined elevation coordinate $z_{gps}(t)$ can be implemented based on any of several criteria. FIG. 3 illustrates a representative situation in which each of the calculated GPS error variable $\sigma_{v,gps}(t) = VDOP(t) \cdot \sigma_\rho(t)$ and the calculated altimeter standard deviation $\sigma_{cal}(t)$ varies with time. The GPS error variable $\sigma_{v,gps}(t)$ reaches a minimum value $\sigma_{v,gps,min}$ at times $t=t_{min,1}$ and $t=t_{min,2}$. The altitude sensor standard deviation $\sigma_{cal}(t)$ reaches a minimum value at a time $t=t_{cal}$ when (re)calibration occurs, beyond which $\sigma_{cal}(t)$ increases approximately linearly with time, as indicated in Eq. (66), until the next altimeter (re)calibration occurs. The altitude sensor readout $z_{alt}(t)$ for the elevation coordinate can be used where $\sigma_{cal}(t)$ is less than $\sigma_{v,gps}(t)$, and the GPS elevation coordinate $z_{gps}(t)$ can be used where this inequality is not satisfied, viz.

$$A_{est}(t) = z_{alt}(t) - C(t_{cal}) \quad (\sigma_{cal}(t) < \sigma_{v,gps}(t), t > t_{cal}), \quad (68A)$$

$$= z_{gps}(t) \quad (\sigma_{cal}(t) > \sigma_{v,gps}(t), t > t_{cal}). \quad (68B)$$

Alternatively, one can favor use of the altimeter value $z_{alt}(t)$ by imposing instead the conditions $$A_{est}(t) = z_{alt}(t) - C(t_{cal}) \ (\sigma_{cal}(t) < \sigma_{v,gsp}(t) + \Delta z_0, t > t_{cal}), \quad (68A)$$

$$= z_{gps}(t) \quad (\sigma_{cal}(t) > \sigma_{v,gps}(t) + \Delta z_0, t > t_{cal}), \quad (69B)$$

where $\Delta z_0$ ($\approx$1–50 meters) is a selected positive constant. Alternatively, one can favor use of the GPS elevation coordinate $z_{gps}(t)$ by imposing Eqs. (69A) and (69B) with $\Delta z_0$ being a selected negative constant. In practice, it is preferable to allow the elevation coordinate z(t) to move between the values $z_{alt}(t)$ and $z_{gps}(t)$ in a transition time interval so that no abrupt changes in z(t) occur.

The system can also switch from use of the GPS elevation coordinate $z_{gps}(t)$ to use of the altitude sensor value $z_{alt}(t)$ whenever a trailhead altitude value becomes available. A trailhead altitude value might be taken from a sign on a trail or roadway indicating the elevation at that point or might be taken from a known elevation of some monument or other feature, such as a hilltop or mountain peak or the surface of a body of water. As noted above, a difference in two consecutive altitude sensor readings $\Delta z_{alt} = z_{alt}(t_2) - z_{alt}(t_1)$ is generally more accurate than a single sensor reading $z_{alt}(t_1)$ or $z_{alt}(t_2)$, because the quantization noise $Q(t)$ is smaller than the altitude bias $B(t)$. Thus, if the altitude sensor is recalibrated with a trailhead value $z_{alt}(t_{trailhead})_{cal}$ of altitude at an appropriate point, the accuracy of subsequent sensor readings can be enhanced by redefining $z_{alt}$ by the relations $$C_{th}(t_{cal}) = z_{alt}(t_{cal}) - z_{trailhead}(t_{cal}), \quad (70)$$

$$A_{est}(t) = z_{alt}(t) - C_{th}(t_{cal}), \quad (71)$$

subject to degradation of subsequent sensor readings by drift as indicated in Eq. (66). The first term on the right in Eq. (68A) is the calibrated altitude, and the second term is the difference between the trailhead altitude value and the calibrated altitude with bias removed.

The system can also switch from use of the GPS elevation coordinate $z_{gps}(t)$ to use of the altitude sensor value $z_{alt}(t)$ by recalibrating the altimeter at an arbitrary but suitable time $t = t_{cal}$, using the alternative definition $$C_{gps}(t_{cal}) = z_{alt}(t_{cal}) - z_{gps}(t_{cal}), \quad (72)$$

$$A_{est}(t) = z_{alt}(t) - C_{gps}(t_{cal}), \quad (73)$$

With reference to the definition in Eq. (72), the user could define $z_{gps}(t_{cal})$ to be an arithmetical average of $N$ ($\geq 2$) consecutive or non-consecutive values of GPS elevation fix $z_{gps}(t)$ over a selected time interval during which the actual elevation changes little or not at all, as in Eqs. (72) and (73).

$$z_{gps}(t_{cal}) = \sum_{i=1} z_{gps}(t_i) / N. \quad (74)$$

$$\sigma_{v,gps}^2 = \sum_{i=1}^{N} \sigma_{v,gps}(t_i)^2 / N. \quad (75)$$

The user 11 could, for example, remain at the same elevation, or remain stationary, during the time interval chosen for calculation of the averages.

Figure 4:
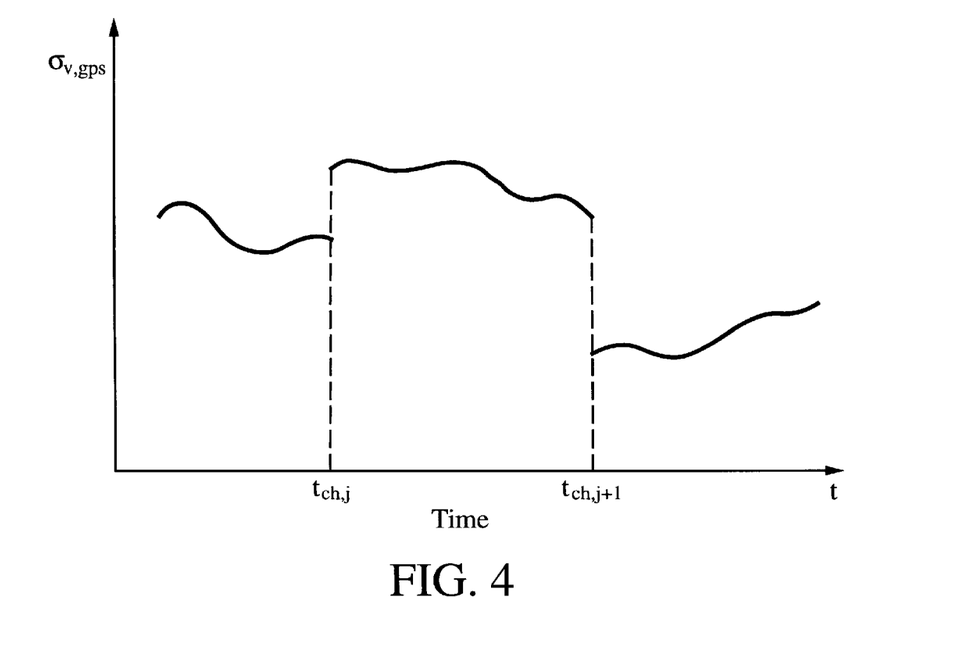
FIG. 4 illustrates the changes in vertical coordinate error that occur with change of GPS satellite configuration used for GPS location calculations.

The satellite configuration used for calculation of the GPS location coordinates will change at certain times $t = t_{ch,j}$ ($j = 1, 2, \ldots$) as a given satellite is added to or deleted from the GPS satellite configuration. At such times, the value of the calculated GPS vertical error $\sigma_{v,gps}(t) = \text{VDOP}(t) \cdot \sigma_\rho(t)$ will often change abruptly, as indicated in FIG. 4, as compared with changes in $\sigma_{v,gps}(t)$ that occur between two consecutive values $t = t_{ch,j}$ and $t = t_{ch,j+1}$. In another alternative for switching between the altimeter reading and the GPS elevation coordinate, a maximum permissible GPS vertical error $\sigma_{v,gps,max}$ is selected and one defines $$A_{est}(t) = z_{alt}(t) - C(t_{cal}) \quad (\sigma_{v,gps}(t) > \sigma_{v,gsp,max}, t > t_{cal}) \quad (76)$$

$$= z_{gps}(t) \quad (\sigma_{v,gps}(t) \leq \sigma_{v,gps,max}, t > t_{cal}).$$

If the definition of $A_{est}$ in Eq. (73) is adopted, it may be preferable to provide a modest time interval of length $\tau \ll \min_{1 \leq i \leq N-1}(t_{ch,j+1} - t_{ch,j})$ for a smoothed transition between the vertical coordinate values $A_{est}(t)$ and $z_{gps}(t)$.

A reference elevation coordinate $z_{ref}(t_{cal})$ can be used to estimate the true elevation or vertical coordinate $z(t)$, for a selected time interval including times $t \geq t_{cal}$ during which: (i) a GPS estimate $z_{gps}(t)$ changes by no more than a selected threshold amount $\Delta z_{gps,thr}$ (e.g., 5–20 meters); (ii) the user determines that the true elevation changes by no more than a selected threshold amount $\Delta z_{gps,thr}$; (iii) the magnitude of the vertical velocity component $|v_{gps,vert}(t)|$, as estimated by the GPS, never exceeds a selected threshold amount $v_{gps,vert,thr}$; or (iv) the magnitude of the horizontal velocity component $|v_{gps,horiz}(t)|$, as estimated by the GPS, never exceeds a selected threshold amount $v_{gps,horiz,thr}$. In such instances the reference elevation coordinate $z_{ref}(t_{cal})$ can be taken as a time average of the GPS estimate of the elevation coordinate $z(t)$, as a time average of the altitude sensor estimate of the elevation coordinate $z(t)$, or as some other conveniently measured value.

The above discussion, which was presented for a GPS location determination system, can be used with any Satellite Positioning System as the location determination system. A Satellite Positioning System (SATPS) is a system of satellite signal transmitters, with receiver/processors located on the Earth's surface or adjacent to the Earth's surface, that transmits information from which an observer's present location and/or the time of observation can be determined. Two operational systems, each of which qualifies as an SATPS, are the Global Positioning System (GPS) and the Global Orbiting Navigational System (GLONASS).

The Global Positioning System (GPS) is part of a satellite-based navigation system developed by the U.S. Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1 = 1575.42$ MHz and an L2 signal having a frequency $f2 = 1227.6$ MHz. These two frequencies are integral multiples $f1 = 1540 \, f0$ and $f2 = 1200 \, f0$ of a base frequency $f0 = 1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency $f$ (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B, Jul. 3, 1991, the information from this material being incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 17–90, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

We claim:

1. A method for determination of location coordinates of a selected position on or adjacent to the Earth's surface with improved accuracy, the method comprising the steps of:

receiving GPS signals from N selected GPS satellites (N≧3) and determining location coordinates ($x_{gps}$, $y_{gps}$, $z_{gps}$) of a selected location on or adjacent the Earth's surface, where the coordinate $z_{gps}(t)$ is an estimate of a true elevation or vertical coordinate A(t) of the selected location relative to a selected vertical reference location at a time t;

providing an altimeter reading $z_{alt}(t)$ that is an estimate of the elevation coordinate A(t) of the selected location relative to the selected vertical reference location at a time t;

computing statistically determined estimates $\sigma_{gps}(t)$ and $\sigma_{alt}(t)$ of the standard deviations of the variables $z_{gps}(t)$ and $z_{alt}(t)$, respectively, for at least one selected time;

defining an estimate $A_{est}(t)$ of the elevation coordinate A(t) of the selected position to be equal to $z_{gps}(t)$ if the standard deviations $\sigma_{gps}(t)$ and $\sigma_{alt}(t)$ satisfy a selected first criterion, defining $A_{est}(t)$ to be equal to $z_{alt}(t)$ if the standard deviations $\sigma_{gps}(t)$ and $\sigma_{alt}(t)$ satisfy a selected second criterion, and defining $A_{est}(t)$ to be equal to a value that lies between the value $z_{gps}(t)$ and the value $z_{alt}(t)$ if the standard deviations $\sigma_{gps}(t)$ and $\sigma_{alt}(t)$ satisfy neither the first criterion nor the second criterion; and calibrating the altimeter reading $z_{alt}$ against an accurate value for $z_{alt}$ at least once at a selected time $t=t_{cal}$ subsequent to a time at which an altimeter reading is initially taken.

2. The method of claim 1, further comprising the step of selecting said first criterion to be $\sigma_{gps}(t)<\sigma_{alt}(t)+\Delta z_1$, and selecting said second criterion to be $\sigma_{gps}(t)>\sigma_{alt}(t)+\Delta z_2$, where $\Delta z_1$ and $\Delta z_2$ are selected real numbers that may be positive, negative or zero, with $\Delta z_1 \leq \Delta z_2$.

3. The method of claim 1, further comprising the step of calibrating said altimeter at said selected time $t=t_{cal}$ by setting said coordinate $z_{alt}(t_{cal})=z_{gps}(t=t_{cal})$.

4. The method of claim 1, further comprising the step of calibrating said altimeter at said selected time $t=t_{cal}$ by setting said coordinate $z_{alt}(t_{cal})$ equal to a trailhead value for said coordinate $z_{alt}$.

5. A method for determination of location coordinates of a selected position on or adjacent to the Earth's surface with improved accuracy, the method comprising the steps of:

receiving GPS signals from N selected GPS satellites and determining location coordinates ($x_{gps}$, $y_{gps}$, $z_{gps}$) of a selected location on or adjacent the Earth's surface, where the coordinate $z_{gps}=z_{gps}(t)$ is an estimate of a true elevation or vertical coordinate $A(t)$ of the selected location relative to a selected vertical reference location at a time t;

providing an altimeter having an altimeter reading $z_{alt}(t)$ that is an estimate of the elevation coordinate $A(t)$ of the selected location relative to the fixed vertical location at a time t;

computing statistically determined estimates $\sigma_{gps}(t)$ and $\sigma_{alt}(t)$ of the standard deviations of the variables $z_{gps}(t)$ and $z_{alt}(t)$, respectively, for at least one selected time t; and defining the elevation coordinate $A(t)$ of the selected location to be a linear combination of the values $z_{gps}(t)$ and $z_{alt}(t)$, defined by $$z(t)=K_1 z_{gps}(t)+K_2 z_{alt}(t),$$

$$K_1=c_1(\sigma_{gps}(t))^p/[c_1(\sigma_{gps}(t))^p+c_2(\sigma_{alt}(t))^q],$$

$$K_2=c_2(\sigma_{alt}(t))^q/[c_1(\sigma_{gps}(t))^p+c_2(\sigma_{alt}(t))^q]=1-K_1,$$

where $c_1$, $c_2$, p and q are selected positive constants.

6. A method for determination of location coordinates of a selected position on or adjacent to the Earth's surface with improved accuracy, the method comprising the steps of:

receiving GPS signals from N selected GPS satellites and determining location coordinates ($x_{gps}$, $y_{gps}$, $z_{gps}$) of a selected location on or adjacent the Earth's surface, where the coordinate $z_{gps}=z_{gps}(t)$ represents a true elevation or vertical coordinate $A(t)$ of the selected location relative to a selected vertical reference elevation at a time t;

providing an altimeter having an altimeter reading $z_{alt}(t)$ that is an estimate of the elevation coordinate $A(t)$ of the selected location at a time t;

computing statistically determined standard deviations $\sigma_{gps}(t)$ and $\sigma_{alt}(t)$ of the variables $z_{gps}(t)$ and $z_{alt}(t)$, respectively, for at least one selected time t;

estimating the elevation coordinate $A(t)$ of the selected location by an estimated value $A_{est}$ given by $$A_{est}(t)=w(t)z_{gps}(t)+(1-w(t))z_{gps}(t),$$

where w(t) is a weight function that tends monotonically toward the value 1 over a selected time interval, if the standard deviations $\sigma_{gps}(t)$ and $\sigma_{alt}(t)$ associated with the variables $z_{gps}(t)$ and $z_{alt}(t)$ satisfy a selected first criterion, and that tends monotonically toward the value 0 if the standard deviations $\sigma_{gps}(t)$ and $\sigma_{alt}(t)$ satisfy a selected second criterion; and calibrating the altimeter reading $z_{alt}$ against an accurate value for $z_{alt}$ at least once at a selected time $t=t_{cal}$ subsequent to a time at which an altimeter reading is initially taken.

7. The method of claim 6, further comprising the step of selecting said first criterion to be $\sigma_{gps}(t)<\sigma_{alt}(t)+\Delta z_1$, and selecting said second criterion to be $\sigma_{gps}(t)>\sigma_{alt}(t)+\Delta z_2$, where $\Delta z_1$ and $\Delta z_2$ are selected real numbers that may be positive, negative or zero, with $\Delta z_1 \leq \Delta z_2$.

8. The method of claim 6, further comprising the step of calibrating said altimeter at said selected time $t=t_{cal}$ by setting said coordinate $z_{alt}(t_{cal})=z_{gps}(t=t_{cal})$.

9. The method of claim 6, further comprising the step of calibrating said altimeter at said selected time $t=t_{cal}$ by setting said coordinate $z_{alt}(t_{cal})$ equal to a trailhead value for said coordinate $z_{alt}$.

10. The method for determination of location coordinates of a selected position on or adjacent to the Earth's surface with improved accuracy, the method comprising the steps of:

receiving GPS signals from N selected GPS satellites and determining location coordinates ($x_{gps}$, $y_{gps}$, $z_{gps}$) of a selected location on or adjacent the Earth's surface, where the coordinate $z_{gps}=z_{gps}(t)$ is an estimate of a true elevation or vertical coordinate $A(t)$ of the selected location relative to a selected vertical reference location at a time t;

providing an altimeter reading $z_{alt}(t)$ that is an estimate of the elevation coordinate $A(t)$ of the selected location relative to the fixed vertical location at a time t;

computing a statistically determined estimate $\sigma_{gps}(t)$ of the standard deviation of the variable $z_{gps}(t)$ for at least one selected time by the following steps:

computing a vertical dilution of precision $VDOP(t)$ and the satellite pseudorange $\rho_i(t)$ for each satellite number i in the satellite configuration used to determine the GPS location coordinates ($x_{gps}$, $y_{gps}$, $z_{gps}$);

forming a product $\max_i\{VDOP(t) \cdot \rho_i(t)\}=\epsilon_V(t)$ representing a statistical error variable for the pseudorange variables; and defining the standard deviation $\sigma_{gps}(t)$ to be the standard deviation $\sigma_{\epsilon V}(t)$ for the error variable $\epsilon_V(t)$;

computing a statistically determined estimate $\sigma_{alt}(t)$ of the standard deviations of the variable $z_{alt}(t)$ for the selected time; and interpreting an estimate $A_{est}(t)$ of the elevation coordinate $A(t)$ of the selected position to be equal to $z_{gps}(t)$ if the standard deviations $\sigma_{gps}(t)$ and $\sigma_{alt}(t)$ satisfy a selected first criterion, and defining $A_{est}(t)$ to be equal to $z_{alt}(t)$ if the standard deviations $\sigma_{gps}(t)$ and $\sigma_{alt}(t)$ satisfy a selected second criterion.

11. The method of claim 10, further comprising the step of choosing said selected first criterion to be $\sigma_{alt}(t)<\epsilon_V(t)+\Delta z_1$ and choosing said selected second criterion to be $\sigma_{alt}(t)>\epsilon_V(t)+\Delta z_2$, where $\Delta z_1$ and $\Delta z_2$ are selected real numbers that can be positive, negative or zero, with $\Delta z_1 \leq \Delta z_2$.

12. The method of claim 10, further comprising the step of choosing said selected first criterion to be $\sigma_{alt}(t)<\epsilon_V(t)+\Delta z_1$ and choosing said selected second criterion to be $\sigma_{alt}(t)>\epsilon_V(t)+\Delta z_2$, where $\Delta z_1$ and $\Delta z_2$ are selected real numbers that can be positive, negative or zero, with $\Delta z_1 \leq \Delta z_2$.

13. A method for determination of location coordinates of a selected position on or adjacent to the Earth's surface with improved accuracy, the method comprising the steps of:

receiving GPS signals from N selected GPS satellites and determining location coordinates ($x_{gps}$, $y_{gps}$, $z_{gps}$) of a selected location on or adjacent the Earth's surface, where the coordinate $z_{gps}=z_{gps}(t)$ represents a true elevation or vertical coordinate $A(t)$ of the selected location relative to a selected vertical reference elevation at a time t;

providing an altimeter having an altimeter reading $z_{alt}(t)$ that is an estimate of the elevation coordinate $A(t)$ of the selected location at a time t;

computing a statistically determined estimate $\sigma_{gps}(t)$ of the standard deviation of the variable $z_{gps}(t)$ for at least one selected time by the following steps:

computing a vertical dilution of precision VDOP(t) and the satellite pseudorange $\rho_i(t)$ for each satellite number i in the satellite configuration used to determine the GPS location coordinates $(x_{gps}, y_{gps}, z_{gps})$;

forming a product $\max_i\{VDOP(t) \cdot \rho_i(t)\} = \epsilon_V(t)$ representing a statistical error variable for the pseudorange variables; and defining the standard deviation $\sigma_{gps}(t)$ to be the standard deviation $\sigma_{\epsilon V}(t)$ for the error variable $\epsilon_V(t)$; computing a statistically determined estimate $\sigma_{alt}(t)$ of the standard deviations of the variable $z_{alt}(t)$ for the selected time t; and estimating the elevation coordinate $A(t)$ of the selected location by an estimated value $A_{est}$ given by $$A_{est}(t) = w(t) z_{gps}(t) + (1 - w(t)) z_{gps}(t),$$

where w(t) is a weight function that tends monotonically toward the value 1 over a selected time interval, if the standard deviations $\sigma_{gps}(t)$ and $\sigma_{alt}(t)$ associated with the variables $z_{gps}(t)$ and $z_{alt}(t)$ satisfy a selected first criterion, and that tends monotonically toward the value 0 if the standard deviations $\sigma_{gps}(t)$ and $\sigma_{alt}(t)$ satisfy a selected second criterion.

* * * * *